United States Patent [19]

Birgmeir

[11] Patent Number: 5,216,521
[45] Date of Patent: Jun. 1, 1993

[54] REPRODUCTION OF PHOTOGRAPHIC ORIGINALS WITH SCATTERED LIGHT CORRECTION

[75] Inventor: Klaus Birgmeir, Putzbrunn, Fed. Rep. of Germany

[73] Assignee: Agfa-Gevaert Aktiengesellschaft, Leverkusen, Fed. Rep. of Germany

[21] Appl. No.: 641,544

[22] Filed: Jan. 15, 1991

[30] Foreign Application Priority Data

Feb. 19, 1990 [DE] Fed. Rep. of Germany ......... 400517

[51] Int. Cl.$^5$ ............................................. G06K 9/36
[52] U.S. Cl. ........................................ 358/447; 358/162
[58] Field of Search .................. 358/474–475, 358/447, 161–163, 37, 111, 75–80; 355/67–71; 359/601, 615; 356/445–448

[56] References Cited

U.S. PATENT DOCUMENTS

| | | | |
|---|---|---|---|
| 3,814,847 | 6/1974 | Longuet | 358/162 |
| 3,883,436 | 5/1975 | Fletcher | 358/162 |
| 4,746,985 | 5/1988 | Waldron et al. | 358/162 |
| 4,876,599 | 10/1989 | Kihara | 358/162 |
| 4,941,190 | 7/1990 | Joyce | 358/447 |
| 4,962,419 | 10/1990 | Hibbard et al. | 358/37 |
| 4,972,256 | 11/1990 | Hirosawa et al. | 358/447 |

Primary Examiner—Stephen Brinich
Attorney, Agent, or Firm—Peter K. Kontler

[57] ABSTRACT

A colored photographic original is scanned at a multiplicity of points in each of the primary colors red, green and blue to generate a set of image signals for each primary color. The average luminance of the original in each primary color is calculated from the radiation used for scanning and respective first correction signals for scattered light arising during scanning are produced from the average luminances. The correction signal for each primary color is subtracted from each image signal of the corresponding set. The corrected image signals are processed to enhance the image carried by the signals. The processed signals are sent to a printer. Furthermore, the processed signals of each set are averaged and the resulting averages used to produce respective second correction signals for scattered light arising during printing. The second correction signal for each primary color is subtracted from each processed signal of the corresponding set. The corrected processed signals are then used to print the image.

29 Claims, 5 Drawing Sheets

REPRODUCTION OF PHOTOGRAPHIC ORIGINALS WITH SCATTERED LIGHT CORRECTION

BACKGROUND OF THE INVENTION

The invention relates generally to the reproduction of an original.

More particularly, the invention relates to a method and apparatus in which an original is scanned at a multiplicity of points to generate signals representing an image of the original. The individual signals are processed to enhance the image and the image is thereafter printed pointwise.

Electronic image processing such as disclosed, for example, in the European Patent No. 123 701 is being increasingly used in the reproduction of positive and negative colored originals. The original is first scanned electrooptically along rows and columns, i.e., point-by-point, to generate signals which represent an image of the original. These image signals are modified in accordance with predetermined criteria. As a rule, the image signals are digitized and then temporarily stored in a digital memory. The image signals are converted into an optical image by means of a printer containing a cathode ray tube which prints the image on paper. Printing is accomplished by successively exposing the paper to light in the three primary colors.

Both pointwise scanning of the original and printing of the image are performed via an objective and appropriate color filters. As the light used for scanning and printing passes through these glass bodies, a certain amount of scattering inevitably occurs. The objective employed for scanning focuses the light on a sensor which generates the image signals and the scattered light increases the light intensity at the sensor, in the dark areas of the image, beyond the desired light intensity. Similarly, the scattered light increases the light intensity on the photographic copy paper, in the light areas of the image, beyond that which is desired. Thus, the scattered light tends to falsify the image. The scattered light has an especially detrimental effect when illuminating portions of the image which require low light intensities because it greatly affects the brightness of the image.

SUMMARY OF THE INVENTION

It is an object of the invention to provide a method which allows image quality to be improved.

Another object of the invention is to provide a method which makes it possible to at least partly correct for the action of scattered radiation.

An additional object of the invention is to provide a method which enables the effects of scattered radiation on a final image to be reduced or eliminated.

A further object of the invention is to provide an apparatus which permits an image to be enhanced.

It is also an object of the invention to provide an apparatus which is capable of at least partially correcting for the action of scattered radiation.

Still another object of the invention is to provide an apparatus which makes it possible to reduce or eliminate the effects of scattered radiation on a final image.

The preceding objects, as well as others which will become apparent as the description proceeds, are achieved by the invention.

One aspect of the invention resides in a method of reproducing an original. The method comprises the steps of scanning the original at a multiplicity of points to establish the luminance of the original and generating values representing the luminance. At least one characteristic value is generated for each point and represents the luminance of the respective point. The characteristic values may, for instance, be proportional to the luminances of the respective points. The method further comprises the steps of establishing an average value which represents an average luminance of the original and calculating a correction for scattering using the average value. The method comprises the additional steps of correcting each of the characteristic values using the correction and reproducing the original based on the corrected characteristic values.

The correction is preferably a constant for the entire original. The correcting step may involve subtracting the correction from each of the characteristic values.

The scanning step may include directing radiation at the original and passing the radiation through at least one optical element which causes scattering of the radiation. The correction then at least partly compensates for scattering of the radiation by the optical element. Optical elements which may be used during scanning and may cause scattering include objectives and color filters. The latter are normally employed for colored originals.

The generating step may comprise deriving a raw characteristic value for each point during the scanning step and processing each of the raw characteristic values. Since the raw characteristic values together represent an image of the original, the operation of processing the individual raw characteristic values corresponds to a pointwise processing of the image. The correcting step may be performed using the raw characteristic values and/or the processed characteristic values.

If the original is colored, the original will generally be scanned in each of the three primary colors red, green and blue. The steps of generating characteristic values, establishing an average value which represents average luminance, calculating a correction for scattering and correcting the characteristic values are then carried out for each of the primary colors.

The scanning step for a colored original may include directing radiation at the original, successively filtering the radiation in the three primary colors red, green and blue as the radiation travels away from the original, and sensing the filtered radiation with a multiplicity of radiation-sensitive elements. The radiation-sensitive elements may, for instance, constitute part of a charge-coupled device. The generating step may involve converting the filtered radiation arriving at the radiation-sensitive elements into output signals which represent respective raw characteristic values for the various points of the original.

The calculating step may be performed using the following equation:

$$U(i) = k(i) \times \overline{U}(i).$$

Here, $\overline{U}(i)$ is a voltage representing the average luminance of the original in one of the primary colors red, green or blue, $k(i)$ is a constant for the respective primary color and for the particular optical system and $U(i)$ is a voltage representing the correction for the respective primary color.

The reproducing step may involve printing an image of the original pointwise. Such printing may be performed by directing a beam of radiation at radiation-sensitive material, regulating the luminance of the beam pointwise and passing the beam through at least one optical element which causes scattering of the beam. The correction here once again at least partly compensates for scattering of the beam by the optical element and, in particular, may at least partly compensate for the effect of scattered radiation from the beam on exposure of the radiation-sensitive material. As before, optical elements which may be employed for printing and may cause scattering include objectives and color filters. A cathode ray tube may be used to produce the printing beam and the screen of the cathode ray tube may likewise be responsible for scattering of the beam. The luminance of the beam may be regulated based on the characteristic values generated for the respective points of the original.

Another aspect of the invention resides in an apparatus for reproducing an original. The apparatus comprises means for scanning the original at a multiplicity of points and for generating values representing the luminance of the original. These values include at least one characteristic value for each point representing the luminance of the respective point. The apparatus further comprises averaging means operatively associated with the scanning and generating means and arranged to establish an average value which represents an average luminance of the original; calculating means operatively associated with the averaging means and arranged to calculate a correction for scattering from the average value generated by the averaging means; correcting means operatively associated with the scanning and generating means and with the calculating means and arranged to correct each of the characteristic values using the correction calculated by the calculating means; and reproducing means operatively associated with the correcting means and arranged to reproduce the original based on the corrected characteristic values.

The apparatus in accordance with the invention may be used to carry out the method of the invention.

The scanning and generating means may include a radiation source, means for directing radiation from the source along a predetermined path in a predetermined direction, and means for supporting the original at a preselected location of the path downstream of the radiation source. The scanning and generating means may additionally include means for diverting a portion of the radiation from the path at another location downstream of the preselected location, and means for detecting the diverted radiation and issuing values which together represent an overall luminance of the original. The detecting and issuing means is arranged to transmit the issued values to the averaging means.

The scanning and generating means may also comprise sensing means at an additional location of the path downstream of the location where radiation is diverted from the path. The sensing means is designed to form an image of the original and the directing means may include an objective for focusing the undiverted portion of the radiation on the sensing means.

The scanning and generating means may include means for generating a characteristic value for each point of the original in each primary color red, green and blue. The detecting and issuing means constituting part of the scanning and generating means may here comprise a respective detecting and issuing device, e.g., a respective photoelectric device, for each of the primary colors. The averaging means includes means for establishing an average value in each primary color and the calculating means includes a multiplying unit for multiplying each average value by a constant so as to obtain a correction for each primary color. The constant or constants will normally be specific to the apparatus, that is, will normally be different for different apparatus. The correcting means includes means for applying a respective correction to each of the characteristic values for the corresponding primary color. The means for applying the corrections may, for instance, be constituted by a unit which subtracts a respective correction from the characteristic values for the corresponding color.

The reproducing means may comprise a printing beam generator, e.g., a cathode ray tube, having a nonlinear relationship between input voltage and beam intensity. The scanning and generating means may include a first unit for supplying the characteristic values to the printing beam generator, and the reproducing means may further comprise a second unit intermediate the first unit and the printing beam generator for adjusting the characteristic values to the nonlinear relationship between input voltage and beam intensity. The correcting means here includes a correcting unit between the first and second units, and the correcting unit may, for instance, be designed to subtract the appropriate correction from each characteristic value.

The first unit may be designed as an antilogarithmic unit. This unit, as well as the second unit, is preferably in the form of a look-up table.

The characteristic values may be proportional to the luminance of the original and to the intensity of the printing beam.

The procedure of the invention for compensating for scattered radiation or light makes it possible to correct the signal for each individual point of an image during any processing stage. This can be accomplished by adding or subtracting a correction as required.

The invention is based on the recognition that, during particular image transfer modes using light rays, the scattered light component for each image point results from the total of the luminance values for the entire image. The average luminance of the image is accordingly a measure of the scattering for all image points with the average luminance for a given color representing the scattering in that color. In this regard, the scattering conditions can differ for the various colors. The amount of scattered light depends upon the characteristics of the specific transfer path, especially the number and thicknesses of the transparent or glass bodies to be traversed. However, reflecting surfaces at the edge of the light path also play a certain role. In complex systems, the amount of scattered light in a transfer stage can be of the order of five percent of the luminance of the entire image.

In the apparatus for performing the method of the invention, scattered light correction in each transfer stage, and particularly the scanning and printing stages, can be accomplished by the subtraction of a scattered light signal which is specific to the original being reproduced and precisely compensates for the scattered light.

The novel features which are considered as characteristic of the invention are set forth in particular in the appended claims. However, the improved reproduction method, as well as the construction and mode of operation of the improved reproduction apparatus, will be best understood upon perusal of the following detailed description of certain specific embodiments when read in conjunction with the accompanying drawings.

DESCRIPTION OF THE PREFERRED EMBODIMENTS

Figure 1:
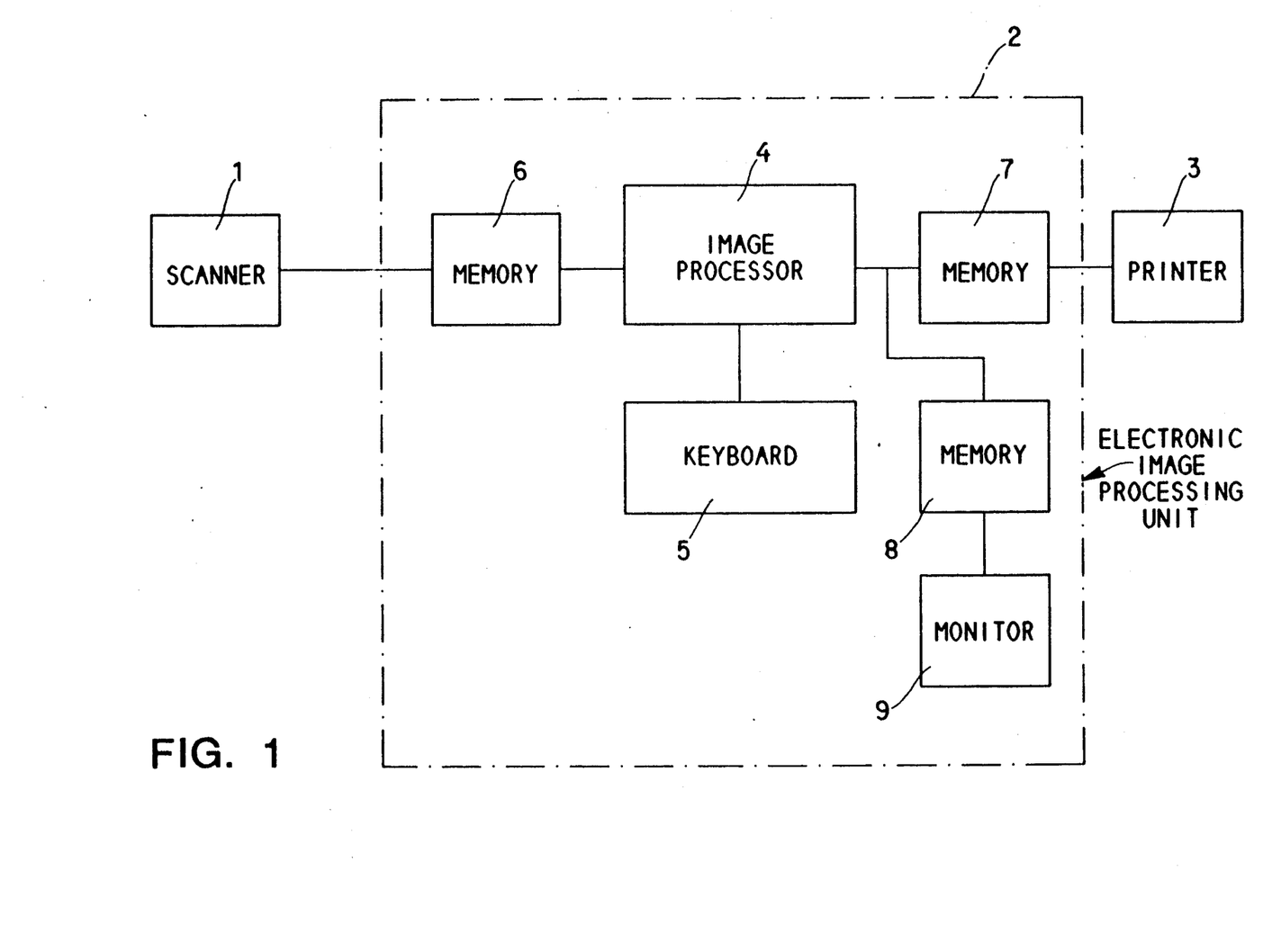
FIG. 1 is a block diagram of an apparatus according to the invention for pointwise scanning of an original, pointwise processing of an image of the original and pointwise printing of the image.

FIG. 1 illustrates an apparatus according to the invention for the reproduction of an original. It is assumed here that the original is colored.

The apparatus includes a scanner 1 which scans the original electrooptically at a multiplicity of points. To this end, the scanner 1 is provided with a sensor in the form of a linear charge-coupled device having a multiplicity of sensing cells which are arranged in a row. The row extends horizontally and the charge-coupled device is moved across the original vertically so that the original is scanned at a series of points defining a set of rows and columns.

The original is scanned successively in the three primary colors red, green and blue. This is accomplished by successively pivoting appropriate color filters into and out of the light path between the charge-coupled device and the original. An electrical image signal is generated for each point of the original in each of the primary colors red, green and blue. Each signal represents a raw characteristic value which is proportional to the luminance of the corresponding point in the respective primary color. The signals together constitute an electrical or electronic image of the original.

The original is here electrooptically scanned at 2048 points per row and 1024 points per column so that the image is composed of 2048×1024 image elements or pixels in each of the three primary colors red, green and blue. A non-illustrated correcting circuit eliminates errors specific to the charge-coupled device, e.g., errors such as dark currents and differing sensitivities of the cells of the charge-coupled device. The corrected image signals are digitized and are subsequently subjected to electronic image processing in an electronic image processing unit 2. The unit 2 processes the image signals point-by-point.

The electronically processed image signals are sent to a printer 3 which may, for example, employ a cathode ray tube for printing. The printer 3 converts the electrical image signals into an optical image which is then printed on photographic recording material, e.g., color negative paper. The optical image in the printer 3 is constructed pointwise by conversion of the electrical image signals. In principle, each pixel can be subjected to electronic image processing and subsequently reproduced on the recording material at coordinates corresponding to the coordinates of the respective pixel on the original.

The actual electronic image processing takes place in an image processor 4 constituting part of the electronic processing unit 2. The image processor 4 can be controlled from externally by a keyboard 5. A first memory 6 for temporary storage of the image signals is disposed upstream of the image processor 4 as considered in the direction of transmittal of the image signals and a second memory 7 for temporary storage of the image signals is located downstream of the image processor 4. The intermediate memories 6 and 7 allow the printer 3 to retrieve and print an image from the memory 7 while a new image is simultaneously loaded into the memory 6 and processed in the image processor 4. The three basic procedures of scanning with the scanner 1, image processing with the image processor 4 and printing with the printer 3 can thus be made independent of one another with respect to time.

The processed image which is derived from the image processor 4 and is ready for printing can be observed on a monitor 9 after temporary storage in a third memory 8 disposed upstream of the monitor 9. The monitor memory 8 and the monitor 9 are considered to constitute part of the electronic image processing unit 2 since an operator who evaluates every processed image on the monitor 9 prior to printing can enter any corrections which may be necessary, e.g., in color and/or luminance, on the keyboard 5.

When processing of the image in the electronic image processing unit 2 has been completed, the memory 7 contains a set of signals for the three primary colors red, green and blue which have been optimized as regards color saturation, contrast and sharpness.

Figure 2:
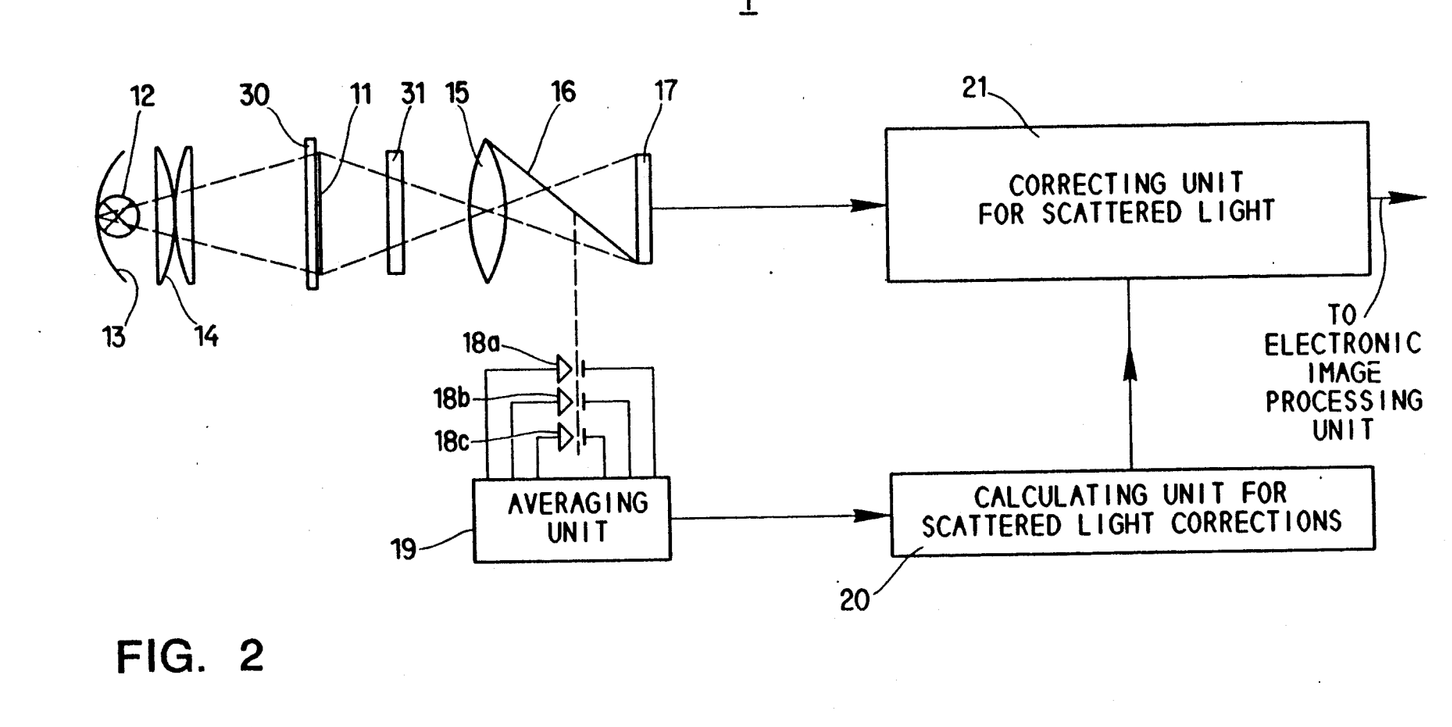
FIG. 2 illustrates details of the scanner constituting part of the apparatus of FIG. 1.

FIG. 2 illustrates certain details of the scanner 1. The reference numeral 12 identifies a light source which completely and uniformly illuminates a transparent original 11 via a reflector 13 and a condenser 14. The original 11 is appropriately positioned in the path of the light rays from the light source 12 by means of a support 30. The original 11 may, for instance, be constituted by a diapositive, that is, a positive transparent original. However, in order to explain the effect of scattered light, the original 11 is here assumed to be a synthetic original which has maximum transparency in the lower half thereof, i.e., is merely fogged in the lower half thereof, and is opaque in the upper half thereof. An image of the original 11 is formed and focused on a sensor 17 via an objective 15. As described previously, the sensor 17 is here in the form of a linear charge-coupled device having a multiplicity of sensing cells arranged in a horizontally extending row. The charge-coupled device 17 is shifted by a non-illustrated moving mechanism in a plane perpendicular to the axis of the optical reproduction system and to the plane of FIG. 2 so that it moves across the original 11. In this manner, the entire original 11 is scanned by the charge-coupled device 17. The charge-coupled device 17, which scans the original 11 at a multiplicity of points as explained earlier, generates output signals proportional to the luminances of the respective points. Each of these signals includes a base signal which is uniform over the entire original 11. This base signal is attributable to the scattered light diffusely issuing from the objective 15. The base signal is added to the luminance signals for the transparent half of the original 11.

Color filters are provided at an appropriate location of the light path, e.g., upstream of the objective 15, to permit the scanning of colored originals. The color filters, which are generally denoted by 31, can be selectively moved into the light path. Thus, if the original 11 is colored, a series of signals for each of the primary colors red, green and blue can be obtained from the charge-coupled device 17 by successively scanning the original 11 three times using a different color filter during each scanning operation.

A beam splitter 16 is disposed between the objective 15 and the charge-coupled device 17. The beam splitter 16 reflects a small portion of the total radiation travelling towards the charge-coupled device 17 through an angle of 90 degrees and to three photoreceivers or detectors 18a, 18b and 18c which are respectively sensitized in one of the primary colors red, green and blue. The photoreceivers 18a,18b,18c which may, for instance, be constituted by photocells are connected to an averaging unit 19. Each of the photoreceivers 18a,18b,18c generates signals or values which are proportional to the the averaging unit 19 averages the signals or values for each primary color. Accordingly, the averaging unit 19 produces three average signals or values corresponding to the three primary colors.

A unit 20 for calculating corrections for scattered light is connected to the averaging unit 19. The calculating unit 20 multiplies each of the average signals from the averaging unit 19 by a correction factor or constant k(i) in accordance with the following equation:

$$U(i) = k(i) \times \overline{U}(i)$$

Here, $\overline{U}(i)$ is an average voltage which is obtained from the averaging unit 19 and represents the average luminance of the original 11 in one of the primary colors red, green and blue while U(i) is a voltage representing a scattering correction for the respective primary color. The index i, which indicates that the corresponding parameter is a function of color, is applied to the constant k because, depending upon the circumstances, the constant k may vary with color and may have to be determined individually for each of the primary colors.

The output signals of the calculating unit 20 are sent to a correcting unit 21 which corrects the image signals or raw characteristic values generated by the charge-coupled device 17 for scattered light. The correcting unit 21 may, for example, be constituted by a summing amplifier. The scattering correction calculated for each primary color is applied to all of the image signals for the respective color, that is, to the respective image signal from each point of the original 11. The output of the correcting unit 21 then issues three sets of signals which respectively correspond to the actual luminance or transparency of the original 11 in one of the primary colors red, green and blue. These output signals, which have been corrected for scattered light, are sent to the electronic image processing unit 2 of FIG. 1.

The constant k(i) must be experimentally determined for each apparatus or at least for each type of apparatus. The constant k(i) takes into account the surface characteristics of the optical elements to be penetrated by the light rays, the number of surfaces and the reflectivity of surfaces which are located in the path of the scattered light and create additional scattered light by reflection.

Figure 3:
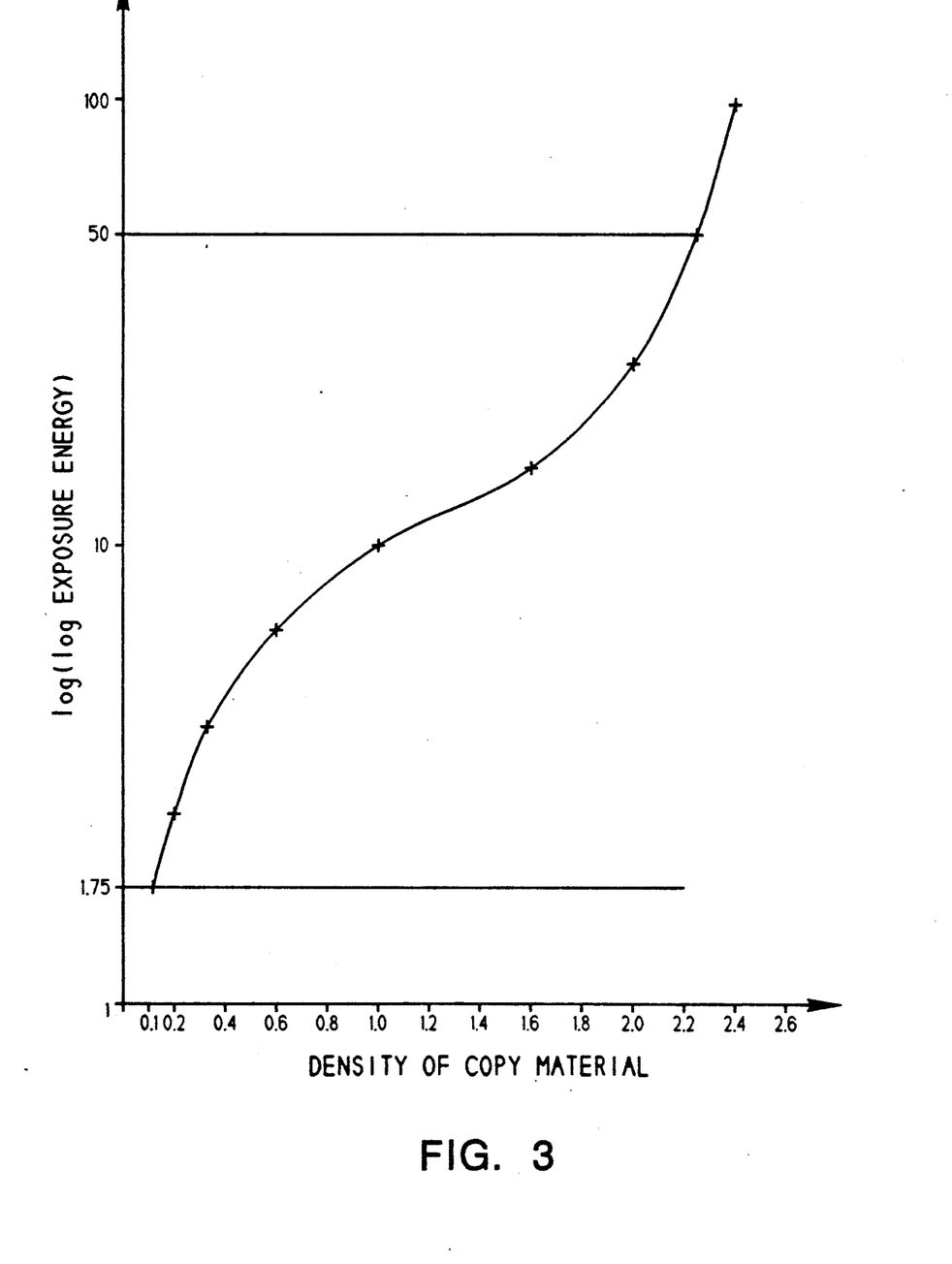
FIG. 3 shows a characteristic darkening curve for photographic copy paper which can be used to print an image in the apparatus of FIG. 1.

The darkening curve of the copy material or paper constitutes a significant factor for scattered light compensation or correction during exposure of the copy paper. A darkening curve is shown in FIG. 3 where the density of the copy material is plotted on the abscissa and log(log exposure energy) is plotted on the ordinate. The exposure energy is the energy available at the printer 3 for exposure of the copy material. The density of the copy material of FIG. 3 ranges from a minimum of 0.115 to a maximum of 2.3 while the energy required for exposure ranges from 1.75 for the minimum density of 0.115 to 50 for the maximum density of 2.3. The minimum density of 0.115 represents the density of the copy material when the latter is merely fogged. The darkening curve is S-shaped. Thus, the degree of darkening increases only slightly with increasing exposure energy in the region of minimum density whereas the degree of darkening increases at a maximum rate at medium densities to thereafter increase more slowly as saturation is approached beyond the maximum density of 2.3. It will be observed that the lowest density in the copy of the image, namely, the density which corresponds to mere fogging of the copy material, is achieved at an energy level of 1.75. Lower energy levels do not cause any noticeable darkening. A general exposure of the copy material at an energy level of 1.75 is essential for the detection of density changes at energy levels slightly above those for the minimum density.

Figure 4:
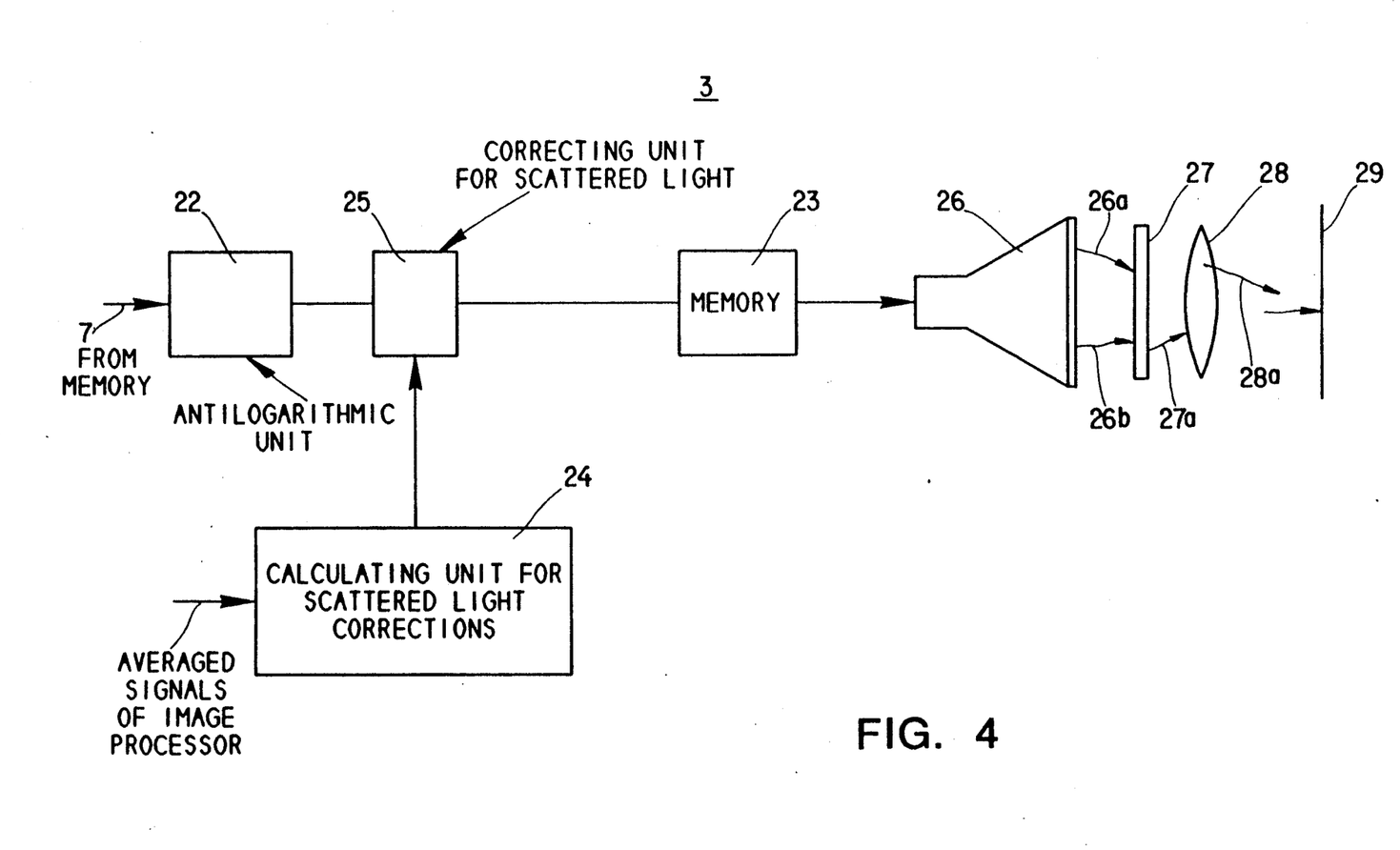
FIG. 4 illustrates details of the printer constituting part of the apparatus of FIG. 1.

FIG. 4 shows certain details of the printer 3 of FIG. 1. A unit 24 serves to calculate corrections for scattered light in the manner to be described with reference to FIG. 5. The corrections are calculated using average signals or values for the three primary colors red, green and blue. The average signal or value for each primary color is obtained by averaging signals or values which have been derived from the scanner 1 and are proportional to the luminance of the original 11, and also to the intensity of the printing beam of the printer 3, in the respective primary color. The corrections calculated by the calculating unit 24 are transmitted to a correcting unit 25 which corrects the processed image signals or processed characteristic values issued by the electronic image processing unit 2 for scattered light. The correcting unit 25 may, for instance, be constituted by a summing amplifier.

The correcting unit 25 is situated between an antilogarithmic unit 22 and a memory 23. Both the antilogarithmic unit 22 and the memory 23 are preferably constituted by a look-up table. The memory 23 is connected to a cathode ray tube 26 which produces the printing beam of the printer 3. A nonlinear relationship exists between the input voltage to the cathode ray tube 26 and the screen brightness of the cathode ray tube 26 or the intensity of the printing beam. This relationship is represented by characteristic lines of the cathode ray tube 26. The characteristic line which applies depends upon the relationship between signal magnitude and the luminance represented by the image signals. The memory 23 serves to store the characteristic lines.

The antilogarithmic unit 22 receives logarithmic luminance signals which are proportional to density from the memory 7 of the electronic image processing unit 2. The antilogarithmic unit 22 takes the antilogarithm of these signals and generates signals or processed characteristic values which are proportional to printing beam intensity or screen brightness of the cathode ray tube 26. The signals issued by the antilogarithmic unit 22, which represent a source of scattered light, are sent to the correcting unit 25 where the scattered light corrections calculated by the calculating unit 24 are applied to the signals. The corrected signals are transmitted to the memory 23 which adjusts or transforms the corrected signals in accordance with the appropriate characteristic line. Following adjustment, the corrected signals are sent to the cathode of the cathode ray tube 26.

It will be observed that the correcting unit 25 constitutes part of the means for processing the signals for the cathode ray tube 26.

The screen or cover plate of the cathode ray tube 26 is focused on photographic color copy material 29, e.g., photographic color copy paper, by means of an objective 28. Color filters indicated generally at 27 can be selectively interposed between the screen and the objective 28 so as to permit the copy material to be successively exposed to light in the three primary colors red, green and blue.

Rays 26a carrying the image of the original 11, as well as rays 26b of scattered light, pass through the screen of the cathode ray tube 26. Scattered light 27a is also produced at the filters 27 while additional scattered light 28a is generated by the objective 28. All of the scattered light 26b,27a,28a is taken into account by a constant k'(i) which varies with color and is determined experimentally. The constant k'(i) further depends upon the individual characteristics of the optical components 26,27,28 and upon reflecting surfaces which may be present in the vicinity of the light path.

Figure 5:
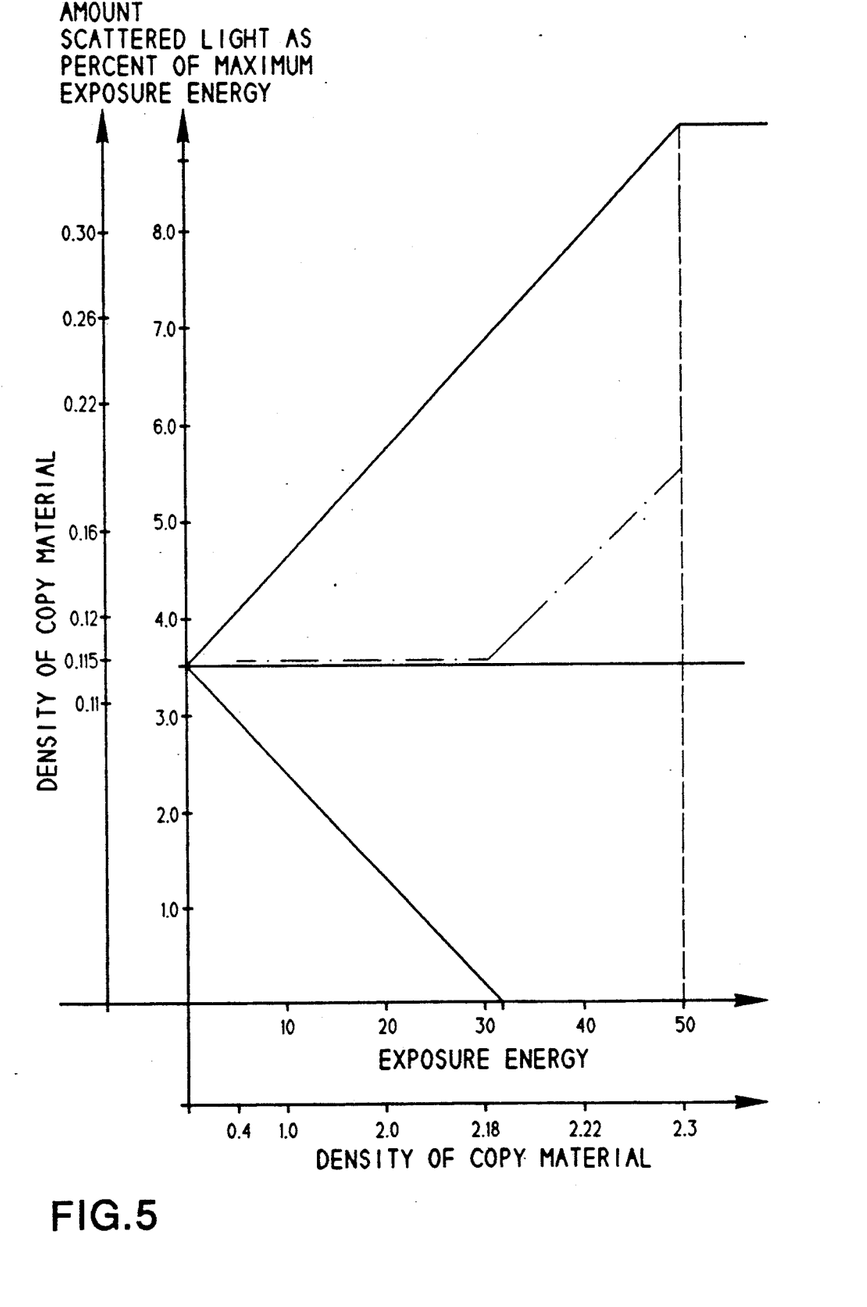
FIG. 5 shows a diagram for calculating scattered light corrections for the printer.

The manner of compensating or correcting for scattered light in the printer 3 is illustrated in the diagram of FIG. 5 which consists of two coordinate systems. One of the abscissas plots the exposure energy applied over the entire surface of the image during printing. The magnitude of the exposure energy here ranges from 0 to 50. This abscissa corresponds to the ordinate of FIG. 3 although the ordinate of FIG. 3 is plotted on a logarithmic scale while the abscissa of FIG. 5 is not. The second abscissa of FIG. 5 plots, on a logarithmic scale, the copy material densities associated with the exposure energies of the first abscissa. Thus, an image requiring maximum luminance over its entire surface would be subjected to an exposure energy of 50 whereas an exposure energy of 25 would be used for an image requiring maximum luminance over half its surface.

One of the ordinates in FIG. 5 plots the amount of scattered light on a proportional luminance scale and, more particularly, in percent of the maximum required exposure energy, i.e., the ratio of the energy of the scattered light to the maximum required exposure energy multiplied by 100 where the maximum required exposure energy is taken as 100 percent. The amount of scattered light here ranges from 1 percent to 9 percent. The second ordinate of FIG. 5 plots, on a logarithmic scale, the copy material densities obtainable with different amounts of the scattered light. In agreement with FIG. 3, the amount of scattered light which will just fog the copy material and give rise to the minimum density of 0.115 is 3.5 percent. Lower energy levels do not result in less darkening than that corresponding to the minimum density.

FIG. 5 shows a line which originates at the point exposure energy=0 amount of scattered light=3.5 and extends upwards at an angle of 45 degrees. This line represents the sum of the scattered light which is generated across the surface of an image during printing of the image by means of a printing beam and is associated with each point of the image. The line rises with increasing average density of the copy material to a maximum value of about 9 percent for the amount of scattered light at an exposure energy of 50 and a copy material density of 2.3. A larger amount of scattered light is not possible. The amount of scattered light which will be present can now be established from the average exposure energy over the surface of the image. Accordingly, the energy of the cathode ray tube 26 for each image point can be reduced by an amount equivalent to the expected amount of scattered light. When the jump associated with the minimum density has been exceeded, as is here the case at an exposure energy of approximately 32, the effective exposure energy must thereafter increase linearly.

Cottection or compensation for scattered light in the printer 3 takes place as follows:

Before the start of printing, signals representing the average luminance of the image in the three primary colors red, green and blue are sent to the calculating unit 24. These signals are generated by summing the output signals of the image processor 4 for each of the primary colors. The processed, logarithmic luminance signals stored in the memory 7 for the three primary colors are then sequentially transmitted to the antilogarithmic unit 22. When the logarithmic luminance signals for a primary color are transferred from the memory 7 to the antilogarithmic unit 22, the corresponding color filter 27 must be positioned in the path of the copy light or printing beam. Based on the expected amount of scattered light, the scattered light corrections for the three primary colors are now calculated from the respective signals representing the average luminance of the image. The corrections are sent to the correcting unit 25 where they are added to or subtracted from the image signals which issue from the antilogarithmic unit 22 and are proportional to luminance. After adjustment of the respective sets of corrected image signals to the appropriate characteristic line of the cathode ray tube 26 in the memory 23, the cathode ray tube 26 sequentially prints the red, green and blue images corresponding to the different sets of adjusted signals on the copy material 29.

The components 22, 25 and 23 need not be individual devices. Instead, the signal processing functions of these three components can be carried out by a single digital computer which performs the respective calculations virtually one after the other.

Printing of the image need not be effected by a cathode ray tube. The scattered light compensation procedure of the invention can also be applied, for example, where the image signals are retrieved from a magnetic or electronic memory and/or where printing is performed with a laser of appropriate color using a deflecting device. The applicable constant or constants must again be determined experimentally.

Scattered light naturally also arises during the recording of images on magnetic or electronic image carriers and affects the quality of the image signals primarily in the dark areas. Since the precise scattered light constants of the recording device are unknown during image processing, scattered light correction in accordance with the invention can here be carried out only on the basis of average estimated values for the proportion of scattered light. However, if scattered light correction is already performed in the recording device, experimental determination of the scattered light constant k and application thereof to the stored image signals can be accomplished without difficulty.

By employing appropriate reversing amplifiers, both positive originals (diapositives) and negative originals can be processed. In each processing stage, the luminance values representing the radiation responsible for the scattered light then determine the magnitudes of the correction signals and the location of the processing path where these are subtracted from the image signals.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of reproducing an original, comprising the steps of scanning said original at a multiplicity of points to establish the luminance of said original; generating values representing the luminance of said original including at least one characteristic value for each of said points representing the luminance of the respective point; establishing an average value which represents an average luminance of said original; calculating a correction for scattering using said average value; correcting each of said characteristic values using said correction; and reproducing said original based on the corrected characteristic values, the reproducing step comprising printing a copy of said original by directing a beam of radiation at radiation-sensitive material, and said printing including regulating the luminance of said beam based on said characteristic values, said correction at least partly compensating for the effect of scattered radiation from said beam on exposure of said material.

2. The method of claim 1, wherein said printing is performed pointwise with a cathode ray tube having a screen which causes scattering of said beam.

3. The method of claim 2, wherein said printing comprises passing said beam through at least one optical element which causes scattering of said beam.

4. The method of claim 3, wherein said optical element comprises a color filter or an objective.

5. A method of reproducing a colored original, comprising the steps of scanning said original at a multiplicity of points to establish the luminance of said original; generating values representing the luminance of said original including at least one characteristic value for each of said points representing the luminance of the respective point; establishing an average value which represents an average luminance of said original; calculating a correction for scattering using said average value; correcting each of said characteristic values using said correction; and reproducing said original based on the corrected characteristic values, the generating, establishing, calculating and correcting steps being performed for each of the primary colors red, green and blue, and the calculating step being performed using the equation $$U(i) = k(i) \times \overline{U}(i)$$

where $\overline{U}(i)$ is a voltage representing the average luminance of said original in one of said primary colors, $k(i)$ is a constant for the respective primary color and for a particular optical system, and $U(i)$ is a voltage 22 representing the correction for the respective primary 23 color.

6. A method of reproducing an original, comprising the steps of scanning said original at a multiplicity of points to establish the luminance of said original; generating values representing the luminance of said original including at least one characteristic value for each of said points representing the luminance of the respective point; establishing an average value which represents an average luminance of said original; calculating a correction for scattering using said average value; correcting each of said characteristic values using said correction, the correcting step comprising subtracting said correction from each of said characteristic values; and reproducing said original based on the corrected characteristic values.

7. The method of claim 6, wherein said correction is a constant for said original.

8. The method of claim 6, wherein the scanning step comprises directing radiation at said original and passing said radiation through at least one optical element which causes scattering of said radiation, said correction at least partly compensating for scattering of said radiation by said optical element.

9. The method of claim 8, wherein said optical element comprises an objective.

10. The method of claim 6, wherein the generating step comprises deriving a raw characteristic value for each point during the scanning step and processing each of said raw characteristic values, said processing including adjusting at least one of color, luminance, contrast and sharpness.

11. The method of claim 10, wherein the correcting step is performed with said raw characteristic values.

12. The method of claim 10, wherein the correcting step is performed with the processed characteristic values.

13. The method of claim 6, wherein the reproducing step comprises printing a copy of said original pointwise, said printing including directing a beam of radiation at radiation-sensitive material, regulating the luminance of said beam pointwise and passing said beam through at least one optical element which causes scattering of said beam, said correction at least partly compensating for scattering of said beam by said optical element.

14. The method of claim 13, wherein said optical element comprises an objective.

15. The method of claim 6, wherein said original is colored and the generating, establishing, calculating and correcting steps are performed for each of the primary colors red, green and blue.

16. The method of claim 15, wherein the scanning step comprises directing radiation at said original, successively filtering said radiation in said primary colors as said radiation travels away from said original, and sensing the filtered radiation with a multiplicity of radiation-sensitive elements, the generating step including converting the filtered radiation arriving at said elements into output signals representing respective raw characteristic values for said points.

17. The method of claim 16, wherein said sensing is performed using a charge-coupled device which contains said elements.

18. A method of reproducing an original, comprising the steps of scanning said original at a multiplicity of points to establish the luminance of said original; generating values representing the luminance of said original including at least one characteristic value for each of said points representing, and being proportional to, the luminance of the respective point; establishing an average value which represents an average luminance of said original; calculating a correction for scattering using said average; correcting each of said characteristic values using said correction; and reproducing said original based on the corrected characteristic values.

19. An apparatus for reproducing an original, comprising means for scanning the original at a multiplicity of points and for generating values representing the luminance of the original including at least one characteristic value for each point representing the luminance of the respective point; averaging means operatively associated with said scanning and generating means and arranged to establish an average value representing an average luminance of the original; calculating means operatively associated with said averaging means and arranged to calculate a correction for scattering from the average value generated by said averaging means; correcting means operatively associated with said scanning and generating means and with said calculating means and arranged to correct each of the characteristic values using the correction calculated by said calculating means; and reproducing means operatively associated with said correcting means and arranged to reproduce the original based on the corrected characteristic values.

20. The apparatus of claim 19, wherein said scanning and generating means comprises a radiation source, means for directing radiation from said source along a predetermined path in a predetermined direction, means for supporting the original at a preselected location of said path downstream of said source, means for diverting a portion of the radiation from said path at another location downstream of said preselected location, and means for detecting the diverted radiation and issuing values which together represent an overall luminance of the original, said detecting and issuing means being designed to transmit the issued values to said averaging means.

21. The apparatus of claim 20, wherein said scanning and generating means further comprises sensing means at an additional location of said path downstream of said other location, said sensing means being designed to form an image of the original, and said directing means including an objective for focusing the undiverted portion of the radiation on said sensing means.

22. The apparatus of claim 20, wherein said detecting and issuing means comprises a detecting and issuing device for each of the primary colors red, green and blue.

23. The apparatus of claim 19, wherein said scanning and generating means comprises means for generating a characteristic value for each point in each primary color red, green and blue, and said averaging means comprises means for establishing an average value in each primary color, said calculating means including a multiplying unit for multiplying each average value by a constant so as to obtain a correction for each primary color, and said correcting means including means for applying a respective correction to each of the characteristic values for the corresponding primary color.

24. The apparatus of claim 23, wherein said correcting means comprises a unit for subtracting a respective correction from the characteristic values for the corresponding primary color.

25. The apparatus of claim 19, wherein said reproducing means comprises a printing beam generator having a nonlinear relationship between input voltage and beam intensity, said scanning and generating means including a first unit for supplying the characteristic values to said generator, and said reproducing means further comprising a second unit between said first unit and said generator for adjusting the characteristic values to said nonlinear relationship, said correcting means including a correcting unit between said first and second units.

26. The apparatus of claim 25, wherein said generator comprises a cathode ray tube and said first and second units comprises look-up tables.

27. The apparatus of claim 25, wherein said first unit is an antilogarithmic unit.

28. The apparatus of claim 25, wherein said correcting unit comprises means for subtracting the correction from each of the characteristic values.

29. The apparatus of claim 25, wherein said scanning and generating means comprises means for generating a characteristic value for each point in each primary color red, green and blue, said averaging means comprises means for establishing an average value in each primary color, said calculating means comprises means for calculating a correction for each primary color, and said correcting unit comprises means for applying a respective correction to each of the characteristic values for the corresponding primary color.

* * * * *